US 8,205,100 B2
Jun. 19, 2012

(12) United States Patent
Saxe et al.

(10) Patent No.: US 8,205,100 B2
(45) Date of Patent: Jun. 19, 2012

(54) METHOD AND SYSTEM FOR POWER MANAGEMENT USING TRACING DATA

(75) Inventors: Eric C. Saxe, Livermore, CA (US); Darrin P. Johnson, San Jose, CA (US); Jonathan J. Chew, San Francisco, CA (US)

(73) Assignee: Oracle America, Inc., Redwood City, CA (US)

( * ) Notice: Subject to any disclaimer, the term of this patent is extended or adjusted under 35 U.S.C. 154(b) by 1035 days.

(21) Appl. No.: 12/142,676

(22) Filed: Jun. 19, 2008

(65) Prior Publication Data

US 2009/0320000 A1 Dec. 24, 2009

(51) Int. Cl.
*G06F 9/50* (2006.01)

(52) U.S. Cl. ........ 713/300; 713/310; 713/320; 713/321; 713/322; 713/323; 713/324; 713/330; 713/340

(58) Field of Classification Search .................. 713/300, 713/310, 320–324, 330, 340
See application file for complete search history.

(56) References Cited

U.S. PATENT DOCUMENTS

| | | | |
|---|---|---|---|
| 5,617,572 A | 4/1997 | Pearce et al. | |
| 5,961,613 A | 10/1999 | DeNicola | |
| 6,609,211 B2 * | 8/2003 | Atkinson | 713/323 |
| 7,194,731 B1 | 3/2007 | Cantrill | |
| 7,251,810 B1 | 7/2007 | Nolte | |
| 7,281,240 B1 | 10/2007 | Cantrill | |
| 7,350,196 B1 | 3/2008 | Cantrill | |
| 7,500,126 B2 * | 3/2009 | Terechko et al. | 713/323 |
| 7,617,488 B2 * | 11/2009 | Srinivasan et al. | 717/130 |
| 2002/0194511 A1 | 12/2002 | Swoboda | |
| 2005/0071688 A1 | 3/2005 | Hepner et al. | |
| 2006/0177004 A1 * | 8/2006 | Gilbert | 379/40 |
| 2007/0192431 A1 * | 8/2007 | Liu | 709/217 |
| 2008/0092121 A1 | 4/2008 | DeRose et al. | |
| 2009/0150893 A1 * | 6/2009 | Johnson et al. | 718/104 |

OTHER PUBLICATIONS

International Search Report for PCT/US2009/047843 mailed Mar. 2, 2010, 3 pages.
Tamches, Ariel and Miller, Barton P; Fine-Grained Dynamic Instrumentation of Commodity Operating System Kernels; [Online]; <http://www.usenix.org/publications/library/proceedings/osdi99/full_papers/tamches/tamches.pdf>, Published Feb. 1999.
Murayama, John; "Performance Profiling Using TNF"; [Online]; <http://developers.sun.com/solaris/articles/tnf.html>, Jul. 2001.
Lorch, Jacob R. and Smith, Alan J.; "The Vtrace Tool: Building a system Tracer for Windows NT and Windows 2000"; [Online] <http://msdn.microsoft.com/msdnmag/issues/1000/Vtrace/default.aspx>, Oct. 2000.

(Continued)

*Primary Examiner* — M Elamin
(74) *Attorney, Agent, or Firm* — Osha • Liang LLP

(57) ABSTRACT

A method for power managing hardware. The method includes determining hardware to power manage, sending a tracing request from a power management control to a tracing framework to obtain usage data of the hardware, and identifying a first probe to obtain first tracing data corresponding to the usage data in a first hardware control software component, where the first hardware control software is configured to interact with the hardware. The method further includes enabling the first probe, obtaining the first tracing data from the first probe, where the first tracing data is obtained when the first probe is encountered during execution of the first hardware control software, and modifying operation of the hardware using the first tracing data.

20 Claims, 4 Drawing Sheets

OTHER PUBLICATIONS

"Chapter 10. The Generalized Trace Facility (GTF)"; [Online]; <http://publib.boulder.ibm.com/cgi-bin/bookmgr/BOOKS/IEA2V100/CCONTENTS>, Jan. 2001.

Mirgorodskii, Alex; "The Path to Portable Kernel Instrumentation: The Kerninst API"; <http://www.dyninst.org/mtg2003/slides/KerninstAPI.pdf>, Apr. 2003.

Richard Moore, et al.; "IBM Dynamic Probes"; http://www-124.ibm.com/developerworks/opensource/linux/projects/dprobes/README, 2000.

K. Yaghmour et al.; "Measuring and Characterizing System Behavior Using Kernel-Level Event Logging"; Proceedings of the 2000 USENIX Annual Technical Conference; Jun. 18-23, 2000, San Diego, California, USA.

* cited by examiner

METHOD AND SYSTEM FOR POWER MANAGEMENT USING TRACING DATA

BACKGROUND

A modern computer system may be divided roughly into three conceptual elements: the hardware, the operating system, and the application programs. The hardware, e.g., the central processing unit (CPU), the memory, the persistent storage devices, and the input/output devices, provides the basic computing resources. The application programs, such as compilers, database systems, software, and business programs, define the ways in which these resources are used to solve the computing problems of the users. The users may include people, machines, and other computers that use the application programs, which in turn, employ the hardware to solve numerous types of problems.

An operating system ("OS") is a program that acts as an intermediary between a user of a computer system and the computer hardware. The purpose of an operating system is to provide an environment in which a user can execute application programs in a convenient and efficient manner. A computer system has many resources (hardware and software) that may be required to solve a problem, e.g., central processing unit ("CPU") time, memory space, file storage space, input/output ("I/O") devices, etc. The operating system acts as a manager of these resources and allocates them to specific programs and users as necessary. Because there may be many, possibly conflicting, requests for resources, the operating system must decide which requests are allocated resources to operate the computer system efficiently and fairly.

Moreover, an operating system may be characterized as a control program. The control program controls the execution of user programs to prevent errors and improper use of the computer. It is especially concerned with the operation of I/O devices. In general, operating systems exist because they are a reasonable way to solve the problem of creating a usable computing system. The fundamental goal of a computer system is to execute user programs and make solving user problems easier. Toward this goal, computer hardware is constructed. Because bare hardware alone is not particularly easy to use, application programs are developed. These various programs require certain common operations, such as those controlling the I/O operations. The common functions of controlling and allocating resources are then brought together into one piece of software: the operating system.

In order to conserve energy, some computer systems incorporate power control mechanisms. For example, Energy Star ("E*") power requirements require system power consumption to be lowered to 15% of the normal operating power consumption level when the system is idle. In order to conserve power, the operating system turns off (or lowers the operating frequencies of) inactive devices, such as hard disks and monitors. The operating system may also conserve power by adjusting the execution of the CPU.

SUMMARY

In general, in one aspect, the invention relates to a method for power managing hardware. The method includes determining hardware to power manage, sending a tracing request from a power management control to a tracing framework to obtain usage data of the hardware, identifying a first probe to obtain first tracing data corresponding to the usage data in a first hardware control software component, wherein the first hardware control software is configured to interact with the hardware, enabling the first probe, obtaining first tracing data from the first probe, wherein the first tracing data is obtained when the first probe is encountered during execution of the first hardware control software, and further modifying operation of the hardware using the first tracing data.

In general, in one aspect, the invention relates to a method for power managing an application. The method includes identifying performance critical section in the application, inserting a start probe into the application prior to the performance critical section, inserting an end probe into the application after the performance critical section, inserting a plurality of resource utilization probes into the performance critical section, wherein each of the resource utilization probes is associated with hardware associated with a system upon which the application is executing, wherein each of the plurality of utilization probes are enabled after the start probe is encountered during execution of the application and disabled after the end probe is encountered during execution of the application, enabling the start probe and the end probe, executing the application, wherein executing the application comprises encountering the start probe, at least one of the plurality of resource utilization probes, and the end probe, wherein usage data is obtained when the at least one resource utilization probe is encountered during execution application, and modifying operation of the hardware using the usage data.

In general, embodiments on the invention relate to a system for power managing software. The system includes hardware, and a power management control, wherein the power management control is configured to send a tracing request from a power management control to a tracing framework to obtain usage data of the hardware, identify a first probe to obtain first tracing data corresponding to the usage data in a first hardware control software component wherein the first hardware control software is configured to interact with the hardware, enable the first probe, obtain the first tracing data from the first probe, wherein the first tracing data is obtained when the first probe is encountered during execution of the first hardware control software, and modify operation of the hardware using the first tracing data.

Other aspects of the invention will be apparent from the following description and the appended claims.

DETAILED DESCRIPTION

Figure 1:
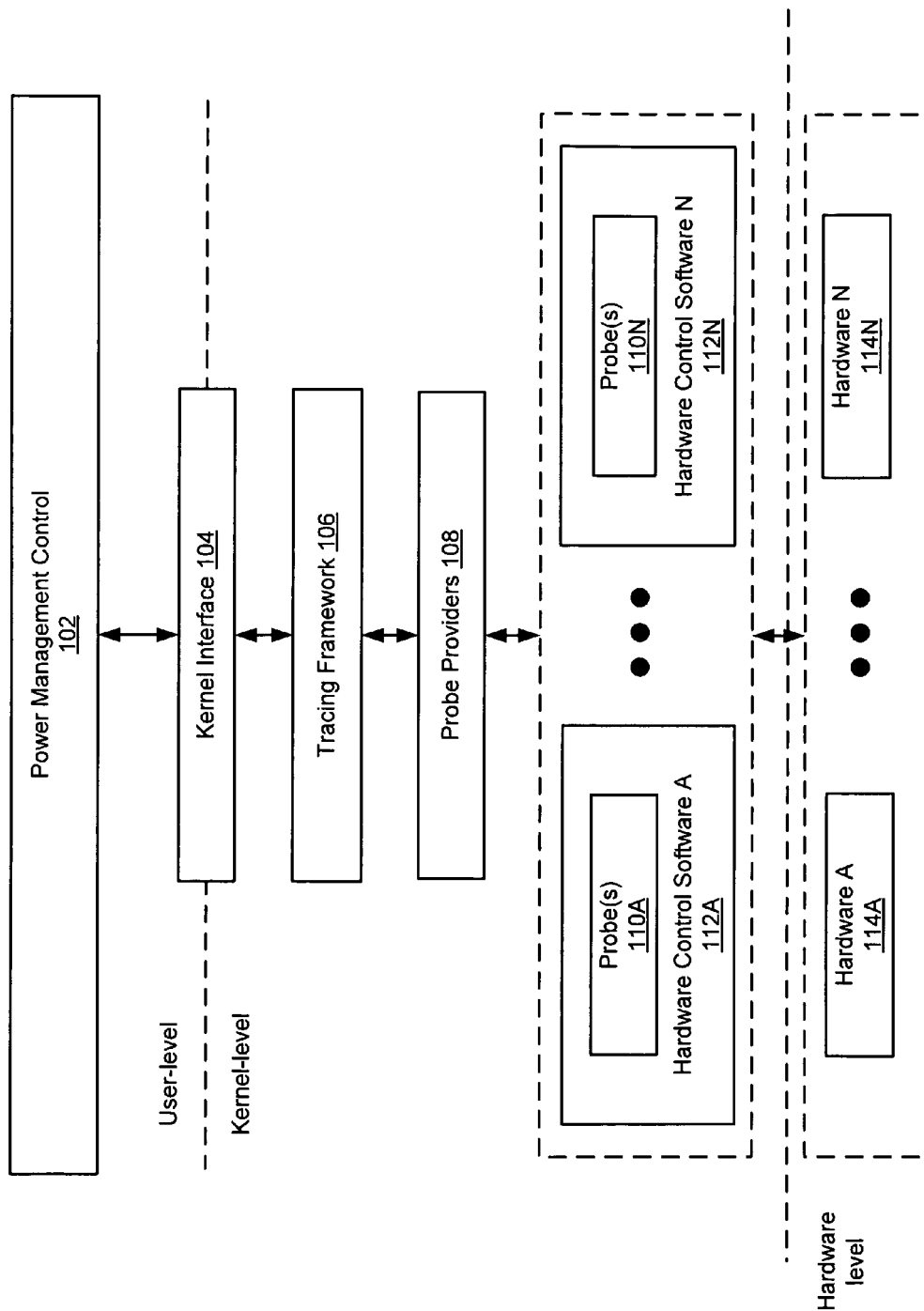
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for managing power in a system using tracing data. More specifically, embodiments of the invention provide a method and system for tracing hardware usage, collecting the tracing data, and using the collected tracing data to modify hardware usage. According to one or more embodiments of the invention, hardware usage is modified using the tracing data as well as a power management policy.

FIG. 1 shows a system in accordance with one or more embodiments of the invention. The system may be viewed as three levels: a user lever, a kernel level, and a hardware level. The user level enables a user to interact with the system through a series of applications. From this level, a user may interact with the underlying hardware through the kernel level. The kernel level of the system manages system resources and acts as an intermediary between the user level and the underlying hardware level.

Within the hardware level is a set of hardware (114A-114N). According to one or more embodiments of the invention, the hardware (114A-114N) may include a variety of devices such as a processor, physical memory, and/or input/output (I/O) devices. An application running on the system relies on these resources during execution. However, the need for each resource may vary from application to application.

The hardware (114A-114N) is directly controlled by a set of hardware-control software (112A-112N). This hardware-control software (112A-112N) is typically located in the kernel level of the system. According to one or more embodiments of the invention, the hardware-control software (112A-112N) is embedded with a series of probes (110A-110N). These probes (110A-110N) are sets of code embedded in the hardware-control software which, when enabled and encountered during the execution of the hardware-control software (112A-112N), have the capability of sending signals back to the probe providers (108). According to one or more embodiments of the invention, the data collected may correspond to or be representative of power usage information.

The probes (110A-110N) embedded within the hardware-control software (112A-112N) are enabled by probe providers (108), which are also within the kernel level of the system. According to one or more embodiments of the invention, these probe providers (112A-112N) manage the probes (110A-110N) based on data required from the hardware-control software to power manage the hardware.

The probe providers (108) enable a set of probes (110A-110N) based on requests received from the tracing framework (106). The tracing framework (106) acts as an intermediary between the power management control (102) and the probe providers (108) by receiving a request for data needed from the hardware-control software (112A-112N), determining which probes should be enabled to retrieve the necessary data, and enabling the selected probe providers (108). One or more embodiments of the tracing framework are described in U.S. Pat. Nos. 7,194,731 and 7,350,196, which are hereby incorporated.

As shown in FIG. 1, the power management control (102), which interacts with the kernel level through a kernel interface (104), is located in the user-level. According to one or more embodiments of the invention, the power management control receives a request to power manage hardware use through an application (not shown) in the user-level. The power management control may also include a power management policy that determines how hardware use is modified to manage power use of the system.

Figure 2:
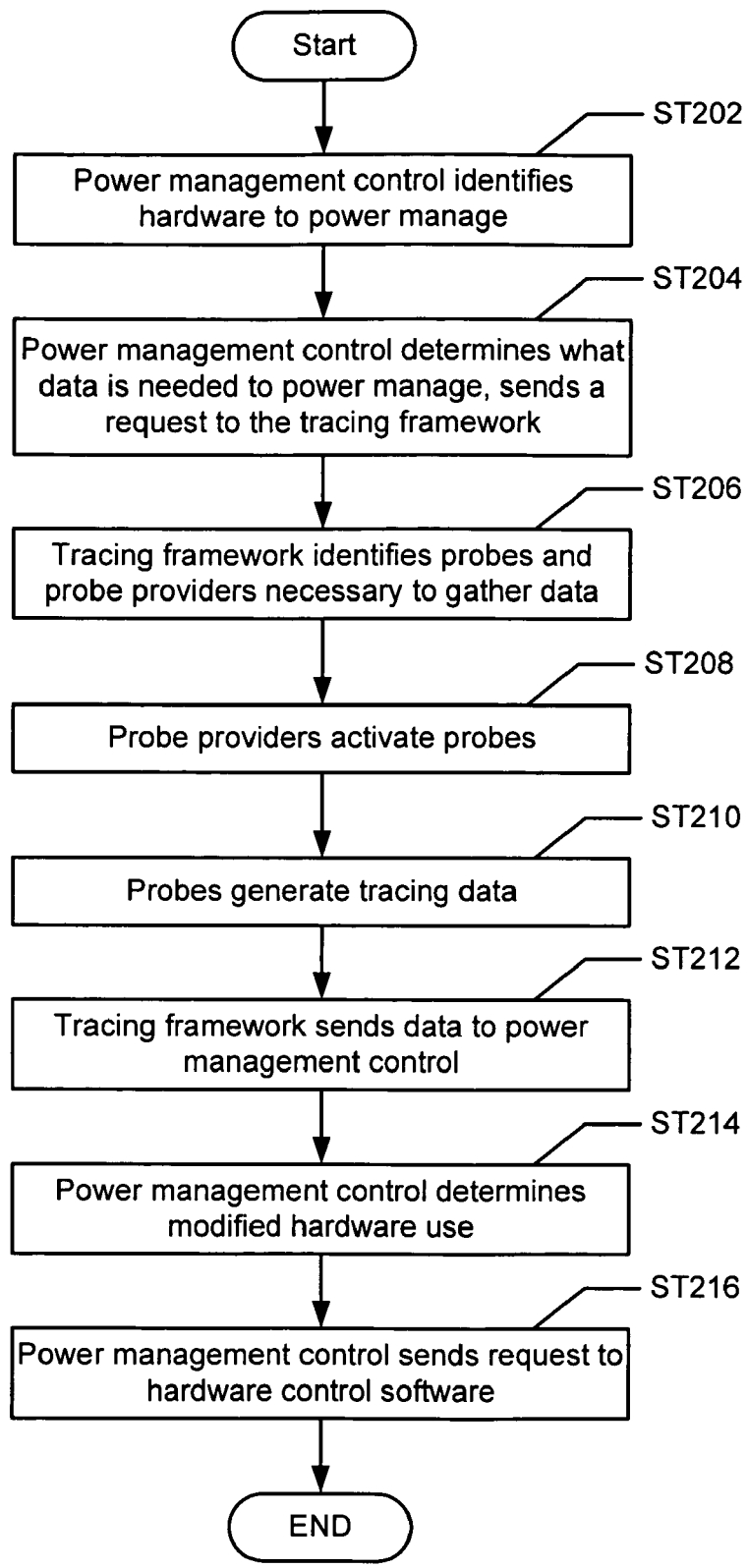
FIG. 2 shows a flowchart in accordance with one or more embodiments of the invention.

FIG. 2 shows a flowchart according to one or more embodiments of the invention. More specifically, FIG. 2 shows a method for power managing hardware in accordance with one or more embodiments of the invention. In step 202, the power management control identifies hardware to power manage. According to one or more embodiments of the invention, the power management control receives a request to power manage hardware from an application in the user level of the system. Alternatively, the power management control may be configured to act on its own to power manage the hardware.

In step 204, the power management control determines what data is needed to power manage the selected hardware and sends a request to the tracing framework for this data. The data needed for power management may be related to power usage of the selected hardware, software utilization of power managable system resources, and the mapping between power manageable resource states and their impact on application performance.

In step 206, the tracing framework identifies probes and probe providers necessary to gather the needed data from the hardware control software. Each probe is associated with a probe provider and the tracing framework identifies the providers to send requests to enable the selected probes. In step 208, the probe providers enable the necessary probes.

In step 210, as the hardware control software executes, the enabled probes generate tracing data as they are encountered and communicate the data back to the tracing framework. In one embodiment of the invention, the tracing data may include information regarding the number of entry-exits before and after an application performs a critical unit of work, information about the number of threads executing on a given processor, etc.

In step 212, the tracing framework sends the tracing data to the power management control. According to one or more embodiments of the invention, the generated data may be compiled from one or more probes enabled and encountered in the hardware control software. Further, the tracing data may come from one or more hardware control software programs associated with the hardware that is the target of the power management control.

In step 214, the power management control determines how to modify use of the hardware using the tracing data from step 212. According to one or more embodiments of the invention, the modified use of the hardware may be determined using the tracing data along with a power management policy, associated with the power management control. In one embodiment of the invention, the power management policy may indicate that the hardware usage is to be modified to decrease power consumption, or to increase performance of the hardware (e.g., increase the number of instructions processed per unit of time, etc.). In step 216, the power management control sends a request to the hardware control software to execute the hardware control software as determined.

While the various steps in this flowchart are presented and described sequentially, one of ordinary skill will appreciate that some or all of the steps may be executed in different orders, may be combined or omitted, and some or all of the steps may be executed in parallel. In addition, steps such as store acknowledgements have been omitted to simplify the presentation.

Figure 3:
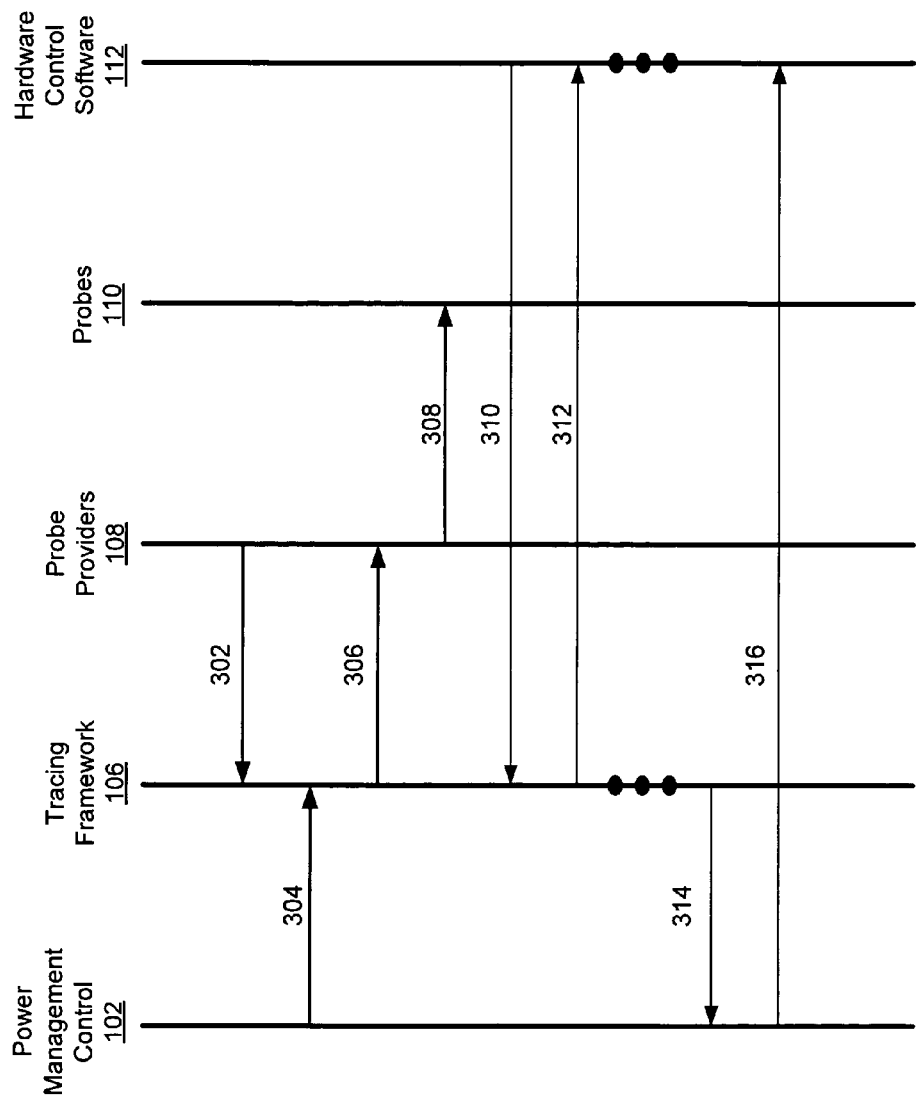
FIG. 3 shows an example flow diagram in accordance with one or more embodiments of the invention.

FIG. 3 shows an flow diagram in accordance with one or more embodiments of the invention. Specifically, the flow diagram in FIG. 3 details an example of data is transmitted across a system in order to power manage hardware. The example is not intended to limit the scope of the invention.

Turning to the example, at 302 probe providers (108) send register with the tracing framework (106), establishing which probe providers (108) control which probes (110A-110N). Using this information, the tracing framework (106) builds a mapping of probe providers (108) and probes (110) in order for the tracing framework (106) to receive requests from the power management control (102) and determine how to enable the correct probes.

At 304, a tracing request is sent from the power management control (102) to the tracing framework (106). According to one or more embodiments of the invention, the request sent to the tracing framework identifies the hardware (not shown) and the request usage data about the hardware. Examples of usage data include, but are not limited to, number of I/O requests per unit time, the amount of time a given processor remains idle, etc.

After receiving the request, the tracing framework (106) selects which probes (110) should be enabled to obtain the data requested by the power management control (102). If power management control (108) is power managing an I/O device, the tracing framework (106) may select probes that would provide data to the tracing framework upon initiation and completion of an I/O request. At (306) the tracing framework sends a request to the corresponding probe providers (108) to enable the selected probes (110). At (308) the probe providers enable the selected probes (110).

After the probes are enabled, the probes may be used to obtain tracing data corresponding to the requested usage data. Said another way, the tracing data gathered by the probes corresponds to the usage data requested by the power management control. Specifically, when a probe is encountered during execution of the hardware-control software (112), the hardware-control software (112) suspends execution and control is transferred to the tracing framework (310). The tracing framework (106) obtains the necessary data by applying one or more actions association with the probe which triggered the transfer of control. Once the data is obtained from the probe, the control is transferred back to the hardware-control software (112) for continued execution (312).

Referring back to the example of power managing an I/O device, the probes would be encountered before and after the I/O request is completed and, accordingly, generate tracing data. This data may include information about the I/O request, the I/O device being used, and the data being transferred as part of the I/O request.

After completion of the execution of the hardware-control software, the tracing framework sends the gathered data to the power management control at (314). The power management control may modify how the hardware is used based on the tracing data and the power management policy. The information/instructions necessary to modify the hardware usage is then sent to the hardware-control software. In the example of power managing an I/O device, the power management control (102) may determine a more power efficient way to utilize the I/O device. For example, the I/O device may be partially spun-down without any decrease in performance of the I/O device. In this case, the power management control may request the hardware-control software to partially spin-down (e.g., to half-speed) the I/O device.

Power managing I/O devices in a system is just one example how resources in a system may be power managed. Another example is power managing a processor. According to one or more embodiments of the invention, tracing techniques may be used to power manage a processor by supplementing data from CPU performance counters (i.e., a set of registers that may be programmed to count occurrences of a given set of "events" over some period of time). In some cases, it may be useful to gather further data to determine CPU performance. One example is encountering probes when a pre-determined count of a specified type of event has been experienced, or using the probes to determine resource utilization of the critical path in an application, where the critical path is the sequence and function of resources used in execution.

Similarly, memory devices may also be power managed using a tracing framework. One example is enabling probes to trace information regarding physical memory addresses accessed over a period of time. In addition, further data regarding memory, such as whether a physical memory address caused a cache miss, may be gathered using a series of probes and returned to the tracing framework such that the power management control may modify memory use using this data along with a power management policy. In one embodiment of the invention, this allows the power management subsystem to understand which physical memory is being used.

Further, probes can be enabled in the application in a manner that demarcates a performance critical section of the application (e.g., the probes may be encountered when a thread executing the application enters the critical section of the application and when the thread exits the critical section of the application). For example, when probes are enabled before and after an I/O request, data may be returned to the tracing framework regarding memory locations. Using this data, the tracing framework may power manage the hardware by spinning down disks that are not being used.

The following is an example of one or more embodiments of the invention, the example is not intended to limit the scope of the application. Turing to the example, consider a scenario in which probes are used to obtain information about a webserving application. In this case, the webserving application's performance critical section is the component of its execution in which a request is received over a network connection for a file and a response (which includes the requested data) is provided to the remote requester over the network connection. The performance of this critical section may depend at least in part on the processor speed of the machine on which the application executes, the speed of the networking speed, and the speed of main memory and/or the speed of the persistent storage device (e.g., hard disk, tape drive, etc.) where the data corresponding to the file is located.

To demarcate the performance critical section, a tracing framework may enable probes (start probes and end probes) that are encountered (i.e., fired) at the start and end of the performance critical section. The latency with which the application services a request may then be characterized by measuring time elapsed between firing of the start/end probes for a thread executing the application. Further, service throughput may be measured by counting the number of start/end probes pairs that fire, in aggregate, (potentially by a plurality of concurrent application threads in the system) per unit time.

Various probes (referred to as "resource utilization probes" may be present in the kernel that fire when a given power manageable resource is utilized. For example, a probe may fire when an I/O request to a disk or networking device is initiated, or when the application begins executing (or when the probe is enabled for the application already executing) on the processor. Information collected during the firing of the probes may include which device(s) is/are being utilized, and other details of the utilization.

By predicating (i.e., the resource utilization probes are not enabled until the start probe is fired and are disable once the end probe is fired) the firing of these "resource utilization" probes on the firing of the "start" probe in the application (and disabling the firing of these probes when the "end" probe is encountered), the tracing framework may collect and return information to the power management control about which resources are being utilized during the performance critical section of the application. The power management control may also characterize and know the performance impact on the critical section by changing the power states of the utilized devices, and then measuring the change in the observed latency and/or throughput. In one embodiment of the invention, using predicates to enable and/or disable probes is described in U.S. Pat. No. 7,281,240, which is hereby incorporated by reference.

Figure 4:
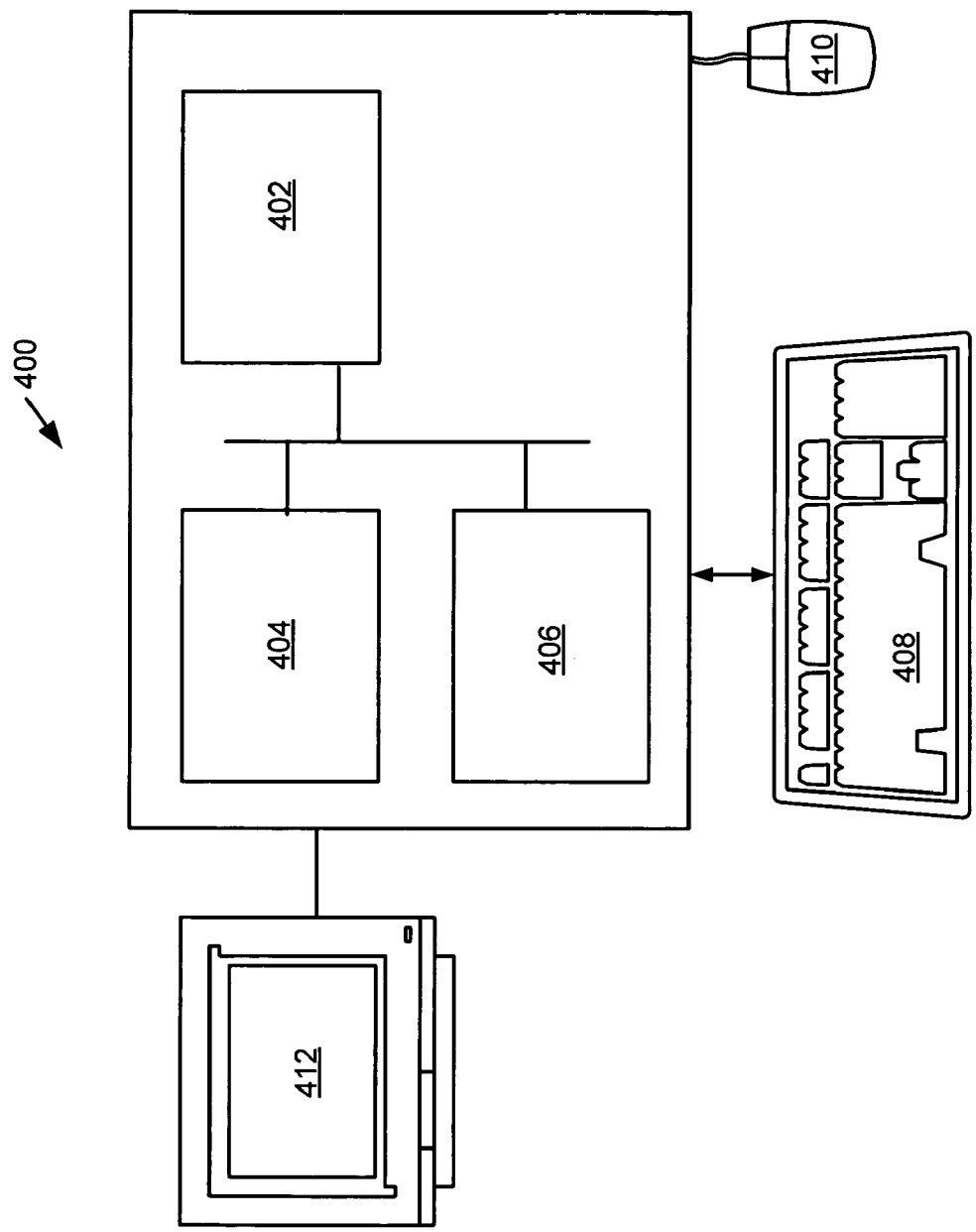
FIG. 4 shows a computer system in according to one or more embodiments of the invention.

Embodiments of the invention may be implemented on virtually any type of computer regardless of the platform being used. For example, as shown in FIG. 4, a computer system (400) includes one or more processor(s) (402), associated memory (404) (e.g., random access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer (400) may also include input means, such as a keyboard (408), a mouse (410), or a microphone (not shown). Further, the computer (400) may include output means, such as a monitor (412) (e.g., a liquid crystal display (LCD), a plasma display, or cathode ray tube (CRT) monitor). The computer system (400) may be connected to a network (514) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

According to one or more embodiments of the invention, some advantages include providing a method and mechanism to evaluate critical paths for power management, providing a method and mechanism to evaluate the result of power management techniques, and allowing modification of a power management policy for more efficient power management.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for power managing hardware, comprising:
   determining hardware to power manage;
   sending a tracing request from a power management control to a tracing framework to obtain usage data of the hardware;
   identifying a first probe to obtain first tracing data corresponding to the usage data in a first hardware control software component, wherein the first hardware control software is configured to interact with the hardware;
   enabling the first probe;
   obtaining first tracing data from the first probe, wherein the first tracing data is obtained when the first probe is encountered during execution of the first hardware control software; and
   further modifying operation of the hardware using the first tracing data.

2. The method of claim 1, further comprising:
   identifying a second probe to obtain second tracing data corresponding to usage data in the first hardware control software component wherein the first hardware control software is configured to interact with the hardware;
   enabling the second probe;
   obtaining the second tracing data from the second probe, wherein the second tracing data is obtained when the second probe is encountered during execution of the first hardware control software; and
   further modifying operation of the hardware using the second tracing data.

3. The method of claim 1, further comprising:
   identifying a second probe to obtain second tracing data corresponding to the usage data in a second hardware control software component, wherein the second hardware control software is configured to interact with the hardware;
   enabling the second probe;
   obtaining the second tracing data from the second probe, wherein the second tracing data is obtained when the second probe is encountered during execution of the second hardware control software; and
   further modifying operation of the hardware using the second tracing data.

4. The method of claim 1, wherein operation of the hardware is modified using a power management policy.

5. The method of claim 4, wherein the power management control is located in a user level.

6. The method of claim 1, wherein the tracing framework is located in a kernel level.

7. The method of claim 1, wherein the hardware is one selected from a group consisting of main memory, a processor, and a persistent storage device.

8. A method for power managing an application, comprising:
   identifying performance critical section in the application;
   inserting a start probe into the application prior to the performance critical section;
   inserting an end probe into the application after the performance critical section;
   inserting a plurality of resource utilization probes into the performance critical section, wherein each of the resource utilization probes is associated with hardware associated with a system upon which the application is executing, wherein each of the plurality of utilization probes are enabled after the start probe is encountered during execution of the application and disabled after the end probe is encountered during execution of the application;
   enabling the start probe and the end probe;
   executing the application, wherein executing the application comprises encountering the start probe, at least one of the plurality of resource utilization probes, and the end probe, wherein usage data is obtained when the at least one resource utilization probe is encountered during execution application; and modifying operation of the hardware using the usage data.

9. The method of claim 8, wherein the operation of the hardware is modified to minimize power usage of the hardware while maintaining a performance level of the application and wherein modifying the hardware comprises modifying the power state of the hardware.

10. The method of claim 9, wherein the hardware is one selected from a group consisting of main memory, a processor, and a persistent storage device.

11. The method of claim 9, wherein the performance level is a duration to time between encountering the start probe and encountering the end probe by a thread executing the application.

12. The method of claim 9, wherein the performance level is a throughput of a plurality of threads through the performance critical section of the application per unit of time.

13. The method of claim 8, wherein operation of the hardware is modified using a power management policy.

14. The method of claim 13, wherein the power management control is located in a user level.

15. A system for power managing software, comprising:
hardware; and
a power management control, wherein the power management control is configured to:
send a tracing request from a power management control to a tracing framework to obtain usage data of the hardware;
identify a first probe to obtain first tracing data corresponding to the usage data in a first hardware control software component wherein the first hardware control software is configured to interact with the hardware;
enable the first probe;
obtain the first tracing data from the first probe, wherein the first tracing data is obtained when the first probe is encountered during execution of the first hardware control software; and
modify operation of the hardware using the first tracing data.

16. The system of claim 15, wherein the power management control is further configured to:
identify a second probe to obtain second tracing data corresponding to the usage data in the first hardware control software component wherein the first hardware control software is configured to interact with the hardware;
enable the second probe;
obtain the second tracing data from the second probe, wherein the second tracing data is obtained when the second probe is encountered during execution of the first hardware control software; and
further modify operation of the hardware using the second tracing data.

17. The system of claim 15, wherein the power management control is further configured to:
identify a second probe to obtain second tracing data corresponding to the usage data in a second hardware control software component wherein the second hardware control software is configured to interact with the hardware;
enable the second probe;
obtain the second tracing data from the second probe, wherein the second tracing data is obtained when the second probe is encountered during execution of the second hardware control software; and
further modify operation of the hardware using the second tracing data.

18. The system of claim 15, wherein operation of the hardware is modified using a power management policy.

19. The system of claim 18, wherein the power management control is located in a user level.

20. The system of claim 15, wherein the tracing framework is located in a kernel level.

* * * * *